United States Patent
Choi et al.

(10) Patent No.: US 9,810,934 B2
(45) Date of Patent: Nov. 7, 2017

(54) DISPLAY DEVICE

(71) Applicant: Samsung Display Co., LTD., Yongin, Gyeonggi-Do (KR)

(72) Inventors: Seong Sik Choi, Seoul (KR); Jae Sang Lee, Asan-si (KR); So Jeong La, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/638,841

(22) Filed: Mar. 4, 2015

(65) Prior Publication Data
US 2016/0054614 A1 Feb. 25, 2016

(30) Foreign Application Priority Data
Aug. 25, 2014 (KR) .................. 10-2014-0110882

(51) Int. Cl.
*G02F 1/1333* (2006.01)
*G02F 1/1335* (2006.01)
*G06F 1/16* (2006.01)

(52) U.S. Cl.
CPC .. *G02F 1/133308* (2013.01); *G02F 1/133608* (2013.01); *G02F 1/133305* (2013.01); *G02F 2001/133317* (2013.01); *G06F 1/1652* (2013.01)

(58) Field of Classification Search
CPC ........ G02F 1/133308; G02F 1/133603; G02F 1/133606; G02F 1/133608; G02F 2001/133317; G02F 2001/133322; G02F 2001/133328; G02F 2001/13332; G02F 1/133305; G06F 1/626; G06F 1/633; G06F 1/1637; G06F 1/1601; G06F 1/1613;
(Continued)

(56) References Cited

U.S. PATENT DOCUMENTS 8,243,227 B2* 8/2012 Oohira .............. G02F 1/133308
  345/100
8,596,809 B2* 12/2013 Johnston .............. G02B 5/0242
  362/606
(Continued)

FOREIGN PATENT DOCUMENTS

KR 1020100110968 A 10/2010
KR 1020120061172 A 6/2012
KR 1020140052446 A 5/2014

OTHER PUBLICATIONS

English translation of Chinese Patent Publication No. CN 201410109849 published on May 28, 2014; downloaded from Google Patents on Apr. 16, 2016 and translated by Google Translate on Apr. 16, 2016.*
(Continued)

*Primary Examiner* — Angela Davison
(74) *Attorney, Agent, or Firm* — H.C. Park & Associates, PLC (57) ABSTRACT

A display device includes a bottom chassis, a mold frame coupled to the bottom chassis, a display panel having curvature and disposed on the mold frame, and a light source disposed on the bottom chassis and configured to supply light to the display panel. The mold frame includes a base unit having a corner portion that has a lower height than a side portion and a protrusion bent and extending from the base unit.

20 Claims, 5 Drawing Sheets

(58) Field of Classification Search
CPC .... G06F 1/1643; G06F 1/1652; G06F 1/1656; H04N 5/64; H04N 5/645
USPC ........ 349/58, 61, 64, 60; 348/789, 794, 836; 362/97.1–97.2, 361, 362, 368; 345/905; 361/724, 679.01, 679.02, 679.21, 679.3, 361/679.55, 679.56
See application file for complete search history.

(56) References Cited

U.S. PATENT DOCUMENTS

| | | | | |
|---|---|---|---|---|
| 2002/0027636 | A1* | 3/2002 | Yamada | G02F 1/133305 349/155 |
| 2010/0230155 | A1 | 9/2010 | Hashizume et al. | |
| 2012/0069261 | A1* | 3/2012 | Lee | G02F 1/133606 349/58 |
| 2012/0169959 | A1* | 7/2012 | Wei | H05K 5/02 349/58 |
| 2012/0236204 | A1* | 9/2012 | Kasai | G02F 1/133603 348/553 |
| 2013/0033656 | A1* | 2/2013 | Urano | G02F 1/133308 349/58 |
| 2013/0277084 | A1 | 10/2013 | McCarthy et al. | |
| 2013/0286320 | A1* | 10/2013 | Kuo | G02F 1/133308 349/58 |
| 2013/0308282 | A1 | 11/2013 | Shin et al. | |
| 2013/0321740 | A1* | 12/2013 | An | H05K 5/0217 349/58 |

OTHER PUBLICATIONS

English translation of Chinese Patent Publication No. CN103823321 published on May 28, 2014; downloaded from Google Patents on Apr. 16, 2016 and translated by Google Translate on Apr. 16, 2016.*

English translation of Chinese Patent Publication No. CN 103823321 published on May 28, 2014; downloaded from Google Patents on Apr. 16, 2016 and translated by Google Translate on Apr. 16, 2016.*

* cited by examiner

DISPLAY DEVICE

CLAIM OF PRIORITY

This application claims priority to and the benefit of Korean Patent Application No. 10-2014-0110882, filed on Aug. 25, 2014, with the Korean Intellectual Property Office, the disclosure of which is incorporated herein in its entirety by reference.

BACKGROUND OF THE INVENTION

Field of the Invention

Aspects of embodiments of the present invention relate to a display device capable of reducing stress of a display panel having curvature.

Description of the Related Art

In general, flat panel display devices such as a liquid crystal display (LCD) device or an organic light emitting display device include a plurality of electrode pairs generating an electric field and an electro-optical active layer interposed therebetween. The LCD device includes a liquid crystal layer as the electro-optical active layer and the organic light emitting display device includes an organic light emitting layer as the electro-optical active layer.

In recent years, as the LCD devices are used as a display device of television receivers, the trend toward a large screen for the LCD devices has been accelerated. However, as the screen size is increased, a viewing angle difference may become disadvantageously increased between a case where a viewer looks at a center portion of a screen and a case where the viewer looks at left and right end portions thereof. Herein, the viewing angle is defined as an angle between a sight line of a screen viewer and a tangent line of a screen which the viewer looks at, and the difference is defined as the viewing angle difference.

In order to compensate for the viewing angle difference, the display device may be concavely or convexly bent into a curved form. The display devices may be categorized into two types with respect to a viewer: a portrait type having a longer vertical length than a horizontal length and curved in a vertical direction; and a landscape type having a longer horizontal length than a vertical length and curved in a horizontal direction.

Meanwhile, a display panel manufactured into a flat form may have a curved form by being fixed at curved bottom and top chassises. Therefore, as the display panel becomes bent, stress may be caused in the display panel, particularly more largely at the corner portion thereof. As the stress is caused, a double refraction phenomenon may occur at the corner portion of the display panel and the light may leak through the corner portion due to this double refraction phenomenon. The light leakage from the corner portion may cause mura defects, that is, a smear on a screen.

Therefore, there is a need for a structure that can reduce stress caused at the corner portions of the curved display panel.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure of invention is directed to a display device capable of reducing stress caused in a display panel by changing a mounting surface of a mold frame on which a stress-concentrated corner portion of the display panel is mounted.

According to an embodiment of the present invention, a display device includes a bottom chassis, a mold frame coupled to the bottom chassis, a display panel having curvature and disposed on the mold frame, and a light source disposed on the bottom chassis and configured to supply light to the display panel. The mold frame includes a base unit having a corner portion that has a lower height than a side portion and a protrusion bent and extending from the base unit.

The display panel may be at least partially spaced apart from the corner portion of the mold frame.

The display panel may be spaced apart from the corner portion of the mold frame in a range from 0.01 mm to 1 mm.

The end portion of the display panel may be in contact with the corner portion of the mold frame.

The display panel may have a larger radius of curvature at the corner portion compared to the side portion of the mold frame.

The side portion of the mold frame may have a long side portion and a short side portion.

The corner portion of the mold frame may include: a first corner portion connected to the long side portion of the base unit; and a second corner portion bent and extending from the first corner portion and connected to the short side portion of the base unit.

The first corner portion may have a length in a range from 90 mm to 120 mm.

The second corner portion may have a length in a range from 100 mm to 120 mm.

The display device may further include a support mold coupled to the bottom chassis.

The display device may further include a diffusion plate fixed to the support mold and configured to guide light emitted from the light source toward the display panel.

The display device may further include an optical sheet between the diffusion plate and the display panel.

According to embodiments of the present invention, a display device is capable of reducing stress caused on a display panel while maintaining curvature of the display panel and also preventing a stain produced at a corner portion of the display panel.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to one embodiment of the present invention will be described with reference to FIGS. 1 and 2.

Figure 1:
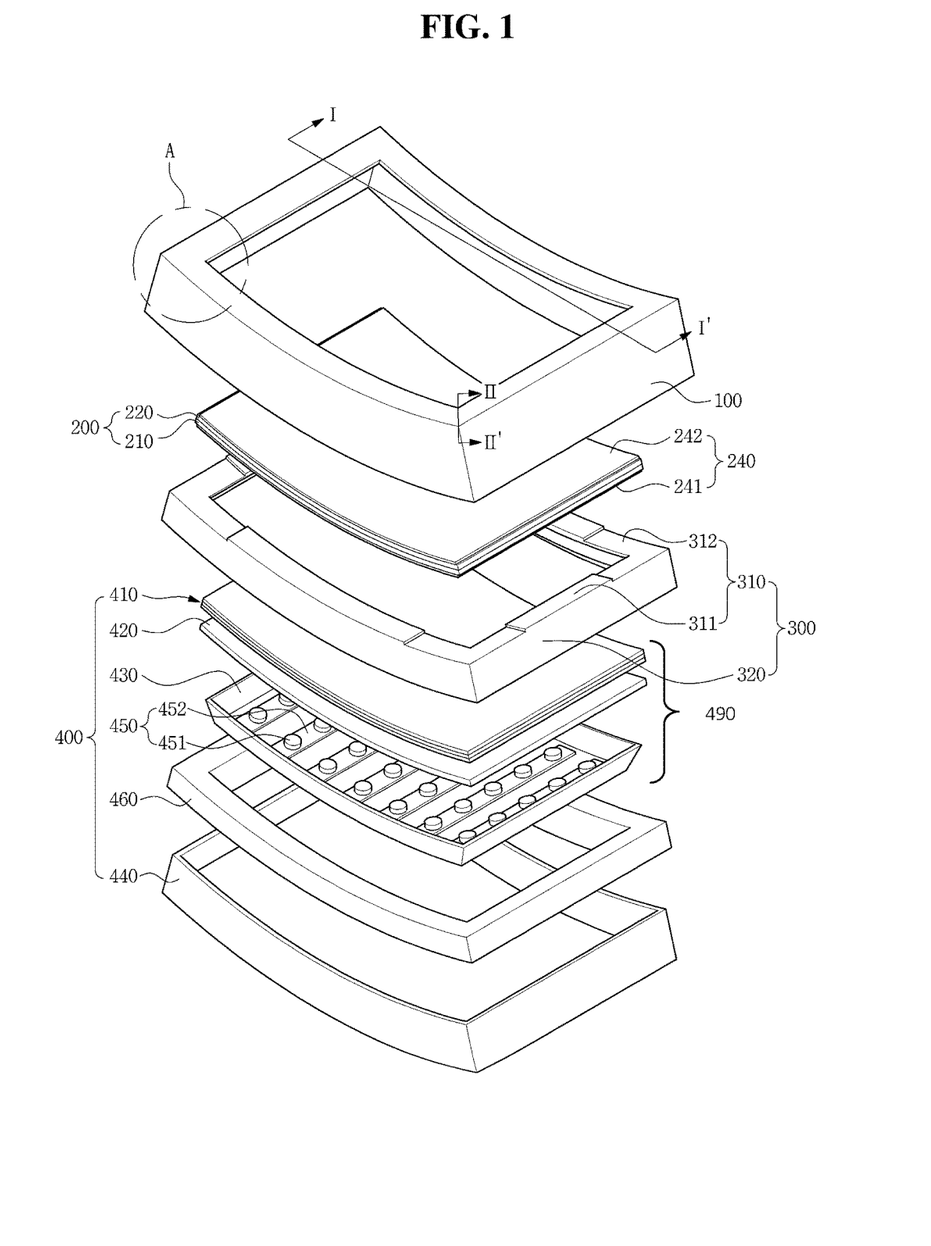
FIG. 1 is a schematic exploded perspective view illustrating a display device according to one embodiment of the present invention.
Figure 2:
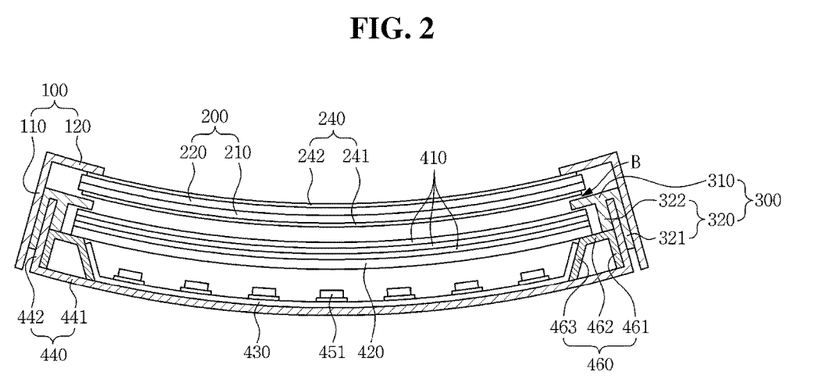
FIG. 2 is a schematic cross-sectional view taken along a line I-I' of FIG. 1.

FIG. 1 is a schematic exploded perspective view illustrating a display device according to one embodiment of the present invention. FIG. 2 is a schematic cross-sectional view taken along a line I-I' of FIG. 1;

Referring to FIGS. 1 and 2, the display device 10 according to one embodiment of the present invention may have a predetermined radius of curvature. That is, the display device 10 may be a curved-type display device where both sides of a display panel 200 is roundly bent with respect to a center portion thereof.

The display device 10 may include a display panel 200, a backlight assembly 400 configured to supply light to the display panel 200, a top chassis 100 configured to cover the display panel 200, and a mold frame 300 on which the display panel 200 is mounted. The above-listed elements may be roundly formed in accordance with the curved surface.

The top chassis 100 may be coupled to the bottom chassis 440 in order to cover the display panel 200 mounted on the mold frame 300. The top chassis 100 may have an opening at a center portion thereof to expose the display panel 200. The top chassis 100 may be disposed to cover an edge portion of an upper surface and side surfaces of the display panel 200.

The top chassis 100 may have a side surface portion 110 configured to cover the side surfaces of the display panel 200 and a protrusion 120 bent from the side surface portion 110 and configured to cover the edge portion of the upper surface of the display panel 200.

The top chassis 100 may be coupled to the bottom chassis 440 by hooks and/or screws. Further, the top chassis 100 and the bottom chassis 440 may be coupled to each other in a variety of methods.

The display panel 200 may have a predetermined radius of curvature. The display panel 200 may be formed of a flexible material. The display panel 200 may be accommodated by the bottom chassis 440, the mold frame 300, and the top chassis 100 and then curved. That is, the bottom chassis 440, the mold frame 300, and the top chassis 100 may fix the display panel 200 so that the display panel 200 may have a predetermined radius of curvature. Therefore, the bottom chassis 440, the mold frame 300, and the top chassis 100 may be formed to have a predetermined radius of curvature similar to the display panel 200.

The display panel 200 may be bent in various methods. For example, if a direction of displaying an image is defined as an upper direction and the opposite direction is defined as a lower direction, the display panel 200 may be convexly bent in the upper or lower direction. However, the bending direction of the display panel 200 may not be limited thereto. In some embodiments, a center portion of the display panel 200 may be convexly bent in the upper direction, that is, convexly bent toward a user. In some embodiments, a part of the display panel 200 may be convexly bent in the upper direction and another part of the display panel 200 may be convexly bent in the lower direction.

The display panel 200 is configured to display an image. The display panel 200 may be a light-receiving type display panel and may be categorized into a liquid crystal display panel, an electrowetting display panel, an electrophoretic display panel, a microelectromechanical system display panel, and the like. It is assumed that the LCD panel is used as one embodiment of the present invention.

The display panel 200 may be provided in a quadrilateral panel form having two pairs of sides in parallel with each other. According to one embodiment of the present invention, the display panel 200 may have a quadrilateral form having a pair of long sides and a pair of short sides. The display panel 200 may include a first substrate 210, a second substrate 220 disposed to face the first substrate 210, and a liquid crystal layer (not illustrated) interposed between the first substrate 210 and the second substrate 220. The display panel 200, when viewed in a plane view, may have a display area on which an image is displayed and a non-display area which surrounds a display area and does not display an image. The non-display area may be hidden by the top chassis 100.

The first substrate 210 may include a plurality of pixel electrodes (not illustrated) and a plurality of TFTs (not illustrated) electrically connected to the plurality of pixel electrodes in one-to-one correspondence. The respective TFTs may function as switches of driving signals supplied to the corresponding pixel electrodes. Further, the second substrate 220 may include a common electrode (not illustrated) forming an electric field controlling an arrangement of the liquid crystals with the pixel electrodes. The display panel 200 may be configured to drive the liquid crystal layer to display an image.

The display panel 200 may include a driving chip (not illustrated) configured to supply a driving signal, a tape carrier package (TCP) on which the driving chip is mounted, and a printed circuit board (not illustrated) electrically connected to the display panel 200 through the TCP. The driving chip may generate a driving signal to drive the display panel 200 in response to an external signal. The external signal refers to a signal supplied from the printed circuit board and may include image signals, a variety of control signals, and driving voltages.

A polarizer 240 may be disposed on the display panel 200 and include first and second polarizers 241 and 242. The first and second polarizers 241 and 242 may be respectively disposed on surfaces of the first and second substrates 210 and 220 opposite from facing surfaces thereof. That is, the first polarizer 241 may be attached on an outer side of the first substrate 210 and the second polarizer 242 may be attached on an outer side of the second substrate 220. A transmissive axis of the first polarizer 241 may be substantially at right angles to a transmissive axis of the second polarizer 242.

The mold frame 300 may be coupled to the bottom chassis 440 and accommodate the display panel 200. Such a mold frame 300 may be formed of a flexible material such as plastics, in order to prevent damage on the display panel 200. However, embodiments of the present invention are not limited thereto, and thus the mold frame 300 can be made of other materials, if having the same form and function.

The mold frame 300 may be provided along the edge portion of the display panel 200 and support the display panel 200 from the bottom thereof. The mold frame 300 may be provided in areas corresponding to four sides or at least a part of the four sides of the display panel 200. For example, the mold frame 300 may have a quadrilateral-loop form corresponding to the four sides of the display panel 200, or may have a 'ㄷ' form corresponding to three sides of the edge portion of the display panel 200. The mold frame 300 may be integrally formed. Further, a plurality of units may be assembled to form the mold frame 300, where necessary.

Meanwhile, the mold frame 300 may be coupled to the top chassis 100. For example, screw holes may be formed on the top chassis 100, the bottom chassis 440, and the mold frame 300, and then the top chassis 100, the bottom chassis 440, and the mold frame 300 may be coupled to each other at a time by a screw. Further, the top chassis 100, the bottom chassis 440, and the mold frame 300 may be coupled to each other to be fixed in a variety of methods.

The backlight assembly 400 may include an optical sheet 410, a diffusion plate 420, a reflective sheet 430, a bottom chassis 440, a light source unit 450, and a support mold 460, of which the optical sheet 410, the diffusion plate 420, the reflective sheet 430, and the light source unit 450 are part of the optical portion 490 of backlight assembly 400.

The light source unit 450 may include a light source 451 and a circuit substrate 452 on which the light source 451 is disposed. The light source unit 450 may be disposed at a bottom portion of the display panel 200. For example, the light source unit 450 may be disposed on one of respective bottom surfaces of the reflective sheet 430 or the bottom chassis 440.

The circuit substrate 452 may be roundly bent. The circuit substrate 452 may have a quadrilateral form and have a reflective surface. For example, a surface of the circuit substrate 452 may be coated with a reflective material. Further, the circuit substrate 452 may be made of a metal material to perform heat dissipation and accommodation functions. In this case, any metal material can be used without limitation and thus a variety of metal materials having high thermal conductivity may be used.

Although not illustrated, the circuit substrate 452 may be partitioned into at least one mounting portion and a (conductive) line portion. In the case where two or more light sources 451 are disposed, one light source 451 may be disposed on each mounting portion and a plurality of (conductive) lines may be disposed on the (conductive) line portion in order to transmit a driving power to the light source 451. The driving power may be generated in a power supplier (not illustrated) and then applied to the plurality of (conductive) lines via a separate connector (not illustrated).

The light source 451 may include a light emitting diode (LED) and the like. The plurality of light sources 451 may provide light for display devices to display image information. Light emitted from the light source 451 may be guided toward the display panel 200 via the diffusion plate 420 and the optical sheet 410. The light sources 451 may be spaced a predetermined distance apart from each other in order to achieve luminance uniformity of the light source unit 450. In some embodiments, the plurality of light sources 451 may be spaced an equal distance apart from each other in width and length directions in a matrix form. In some embodiments, the light sources 451 may be disposed in the row in a length direction but disposed in zigzag in the width direction. In some embodiments, the light sources 451 may be disposed in a row in the width direction but disposed in zigzag in the length direction. However, embodiments of the present invention are not limited thereto, and thus the light sources 451 may be disposed on the circuit substrate 452 in a variety of ways in order to achieve the luminance uniformity. Further, a coupling hole (not illustrated) may be formed on the circuit substrate 452 to allow a coupling member (not illustrated) to be inserted and fixed thereto.

The light source 451 may be a light emitting package including at least one light emitting diode (LED). In some embodiments, one light emitting package may include red, green, and blue LED respectively emitting red, green, and blue light therein. The light emitting package may combine light of three colors and produce white color. In some embodiments, the light emitting package may include only the blue LED of the above-described LED of three colors. In this case, a phosphor may be formed in a light emitting unit of the blue LED, so as to convert blue light into white light. The light emitted from the light source 451 may be incident on a diffusion plate 420.

The diffusion plate 420 may be disposed on the light source unit 450. As illustrated in FIGS. 1 and 2, the diffusion plate 420 may have a roundly curved polyhedron form. The diffusion plate 420 may be formed of a flexible material similar to the display panel 200. That is, the diffusion plate 420 may be firstly provided in a flat form and then transformed into a bent form after assembled with the display device 10. Further, the diffusion plate 420 may be firstly provided in a bent form and may have a solid form without flexibility.

The diffusion plate 420 is configured to receive light emitted from the light source unit 450 and diffuse the light. That is, the diffusion plate 420 may play a role in improving luminance uniformity of the light emitted from the light source unit 450. In more detail, the diffusion plate 420 may allow a bright spot produced in accordance with the arrangement of the light sources 451 not to be seen from a front side of the display device. In some embodiment, the diffusion plate 420 may be spaced a predetermined distance apart from the light source unit 450 with an air layer therebetween.

The diffusion plate 420 may be fixed to the support mold 460. The diffusion plate 420 may be provided, for example, in a quadrilateral-panel form like the display panel 200. However, embodiments of the present invention are not limited thereto, and thus when an LED is used as the light source 451, the diffusion plate 420 may be provided in many different forms and may include predetermined grooves, protrusions, and the like depending on the position of the light source 451.

The diffusion plate 420 is described as a plate for ease of description, but it may be provided in a form of a sheet or film form to achieve slimness of the display devices. That is, the diffusion plate 420 is to be understood as having a concept that includes not only a plate but also a film for guiding light.

The diffusion plate 420 may be formed of a light-transmissive material including, for example, acrylic resins, such as polymethylmethacrylate (PMMA), or polycarbonate (PC) so as to guide light efficiently.

The optical sheet 410 may be disposed on the diffusion plate 420 and configured to diffuse and/or collect light transmitted from the diffusion plate 420. The optical sheet 410 may be roundly bent. The optical sheet 410 may be formed of a flexible material similar to the display panel 200. That is, the optical sheet 410 may be firstly provided in a flat form and then transformed into a bent form after assembled with the display device 10. Further, the optical sheet 410 may be firstly provided in a bent form and may have a solid form without flexibility.

The optical sheet 410 may include a diffusion sheet, a prism sheet, and a protective sheet.

The diffusion sheet is configured to disperse light incident from the diffusion plate 420 so as to prevent the light from being partly concentrated.

The prism sheet may include prisms having a triangular cross-section and formed in a predetermined array on one surface thereof. The prism sheet may be disposed on the diffusion sheet and may collect light diffused from the diffusion sheet in a direction perpendicular to the display panel 200.

The protective sheet may be formed on the prism sheet and may serve to protect a surface of the prism sheet and diffuse light to achieve a uniform light distribution.

The reflective sheet 430 may be disposed between the light source unit 450 and the bottom chassis 440. The reflective sheet 430 may reflect light emitted downwards from the diffusion plate 420 to be directed toward the display panel 200, thereby improving light efficiency. The reflective sheet 430 may be roundly bent.

The reflective sheet 430 may have a bottom portion and a wing portion extended from the bottom portion forming an obtuse angle therewith. The bottom portion of the reflective sheet 430 may be mounted on the bottom chassis 440 and the wing portion of the reflective sheet 430 may be disposed on the support mold 460.

The reflective sheet 430 may be formed of, for example, polyethylene terephthalate (PET) so as to possess reflectivity. One surface of the reflective sheet 430 may be coated with a diffusion layer containing, for example, titanium dioxide.

In some embodiments, the reflective sheet 430 may be formed of a material containing metal, such as silver (Ag).

The support mold 460 may be coupled to the bottom chassis 440 and accommodate the diffusion plate 420 and the optical sheet 410. The support mold 460 may be formed of a flexible material such as plastics, in order to prevent damage on the support mold 460, the diffusion plate 420 and the optical sheet 410.

The support mold 460 may include a side surface portion 461, a diffusion plate mounting unit 462 bent and extending from the side surface portion 461, and an inclined portion 463 extended forming an obtuse angle with the diffusion plate mounting unit 462. The side surface portion 461 may be coupled to the bottom chassis 440. The diffusion plate 420 and the optical sheet 410 may be disposed on the diffusion plate mounting unit 462 and the reflective sheet 430 may be disposed on the inclined portion 463.

The support mold 460 may support the diffusion plate 420 and the optical sheet 410. The support mold 460 may be provided in areas corresponding to four sides or at least a part of the four sides of the diffusion plate 420 and the optical sheet 410. In some embodiments, the support mold 460 may have a quadrilateral-loop form corresponding to the four sides of the diffusion plate 420 and the optical sheet 410, or may have a ' ⊏ ' form corresponding to three sides of the edge portion of the diffusion plate 420 and the optical sheet 410.

The bottom chassis 440 may directly or indirectly support the light source unit 450, the optical sheet 410, the reflective sheet 430, the diffusion plate 420, and the support mold 460. The bottom chassis 440 may be roundly bent.

The bottom chassis 440 may include a bottom portion 441 and a supporting wall 442 bent and extending from the bottom portion 441. The bottom portion 441 of the bottom chassis 440 may be in parallel with the diffusion plate 420.

The bottom chassis 440 may be formed of a metal material having rigidity, such as stainless steel, or a material having good heat dissipation properties, such as aluminum or an aluminum alloy. The bottom chassis 440 according to one embodiment of the present invention may be responsible for maintaining a framework of the display device and protecting a variety of elements accommodated therein.

In such a curved display device, stress may be produced in the display panel 200 as the display panel 200 becomes bent. The stress refers to resistive force or transformation stress generated inside an object when an external force is applied on the object. The stress becomes increased as the external force increases. The capability of the object to endure stress may be limited, and thus the object may be destroyed, for example, when subjected to eigen-yield stress. An object having large eigen-yield stress may have great rigidity. A stress magnitude may be expressed as a magnitude of the external force per unit area, referred to as unit stress. Hereinafter, the stress refers to unit stress, unless stated otherwise.

Light may leak toward the corner portion of the display panel 200 by the stress and the light leakage may produce a smear in the display panel 200.

Therefore, a mold frame 300 spaced apart from the display panel 200 at the corner portion 312 may be provided to reduce the stress in the display panel. Hereinafter, the mold frame 300 according to one embodiment of the present invention will be described with reference to FIGS. 2 to 7C.

Figure 3:
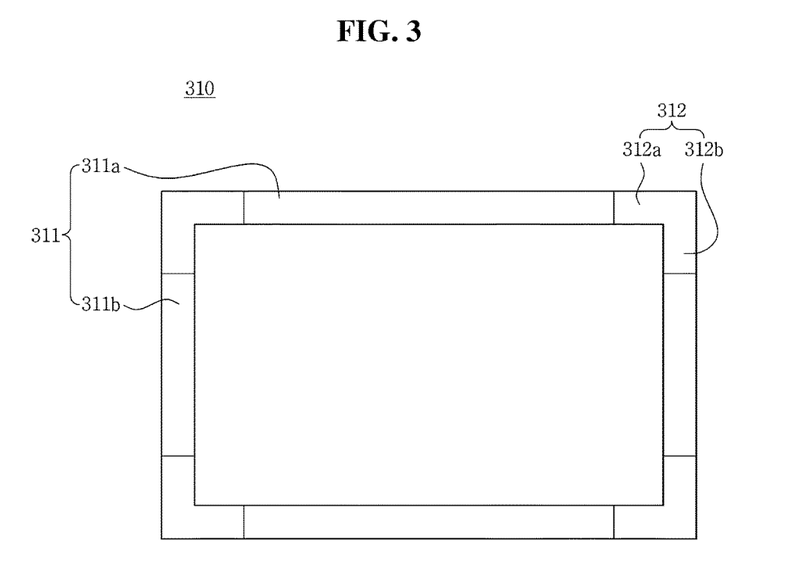
FIG. 3 is a schematic plan view illustrating a mold frame according to one embodiment of the present invention.
Figure 4:
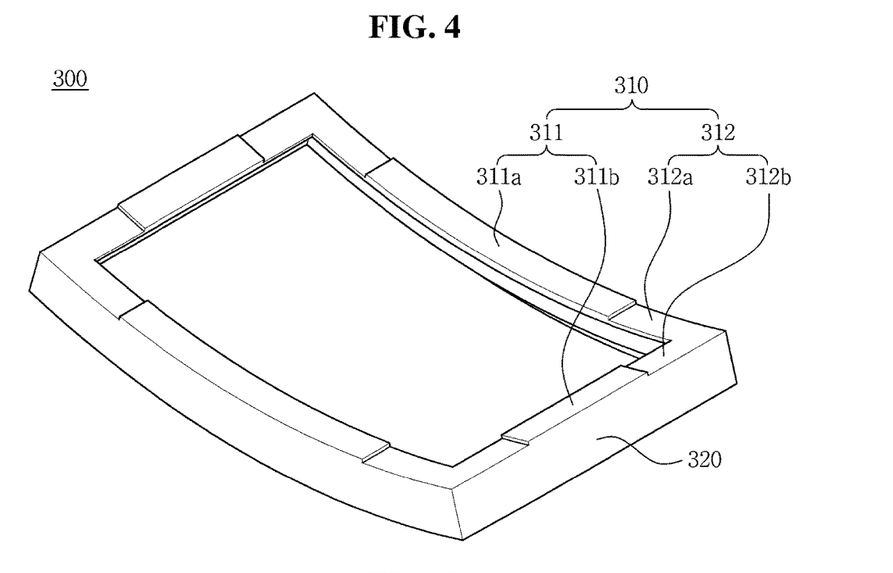
FIG. 4 is a schematic perspective view illustrating a mold frame according to one embodiment of the present invention.
Figure 5:
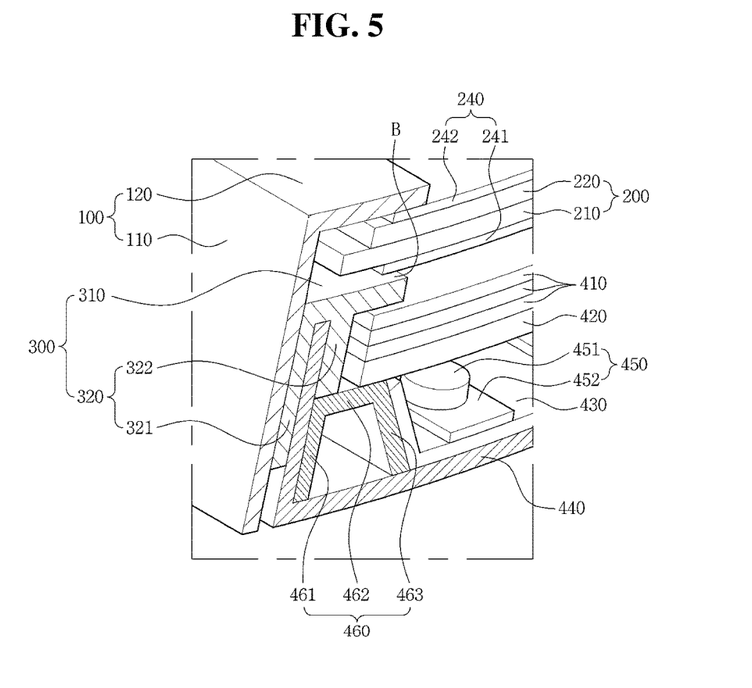
FIG. 5 is an enlarged perspective view illustrating an "A" part of FIG. 1.
Figure 6:
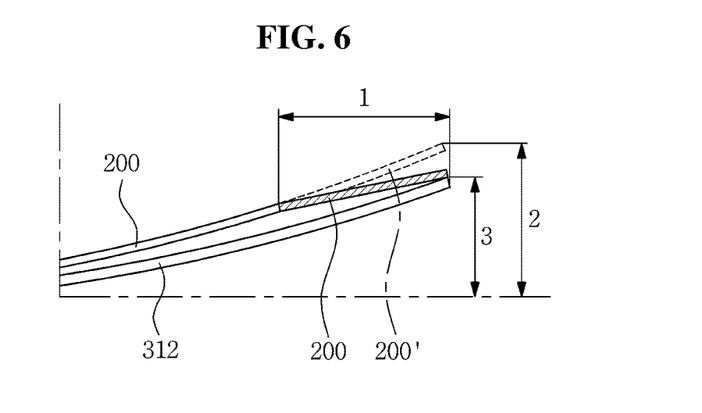
FIG. 6 is a schematic cross-sectional view taken along a line II-II' of FIG. 1.
Figure 7A:
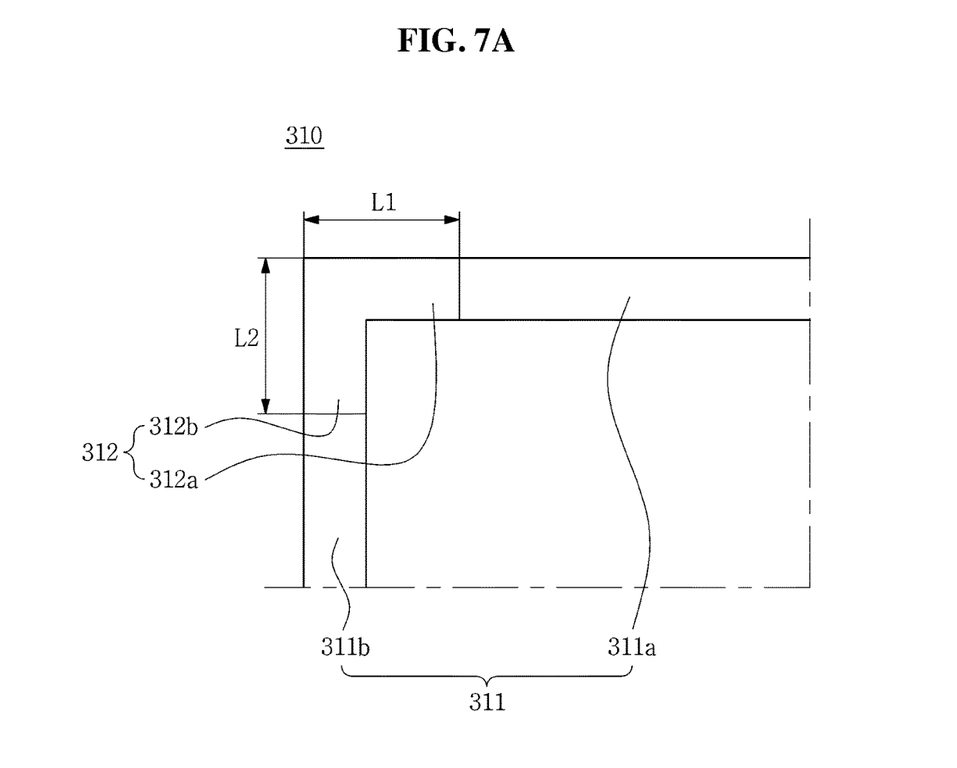
FIGS. 7A to 7C are graphs illustrating stress caused in the display panel in accordance with a length of a corner portion and a gap of the display panel.
Figure 7B:
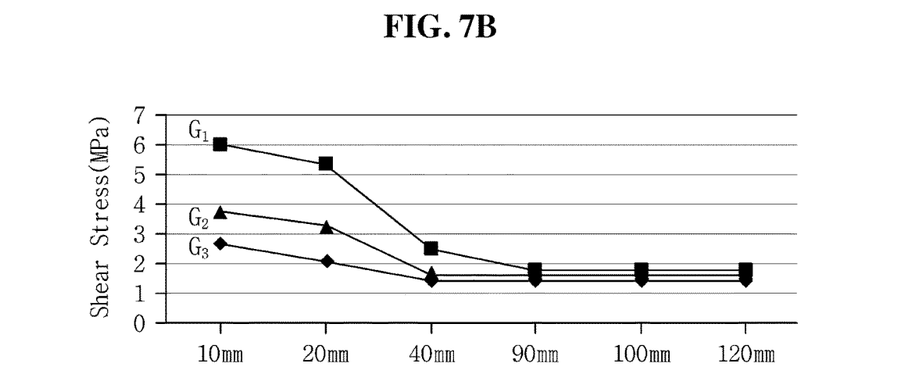
Figure 7C:
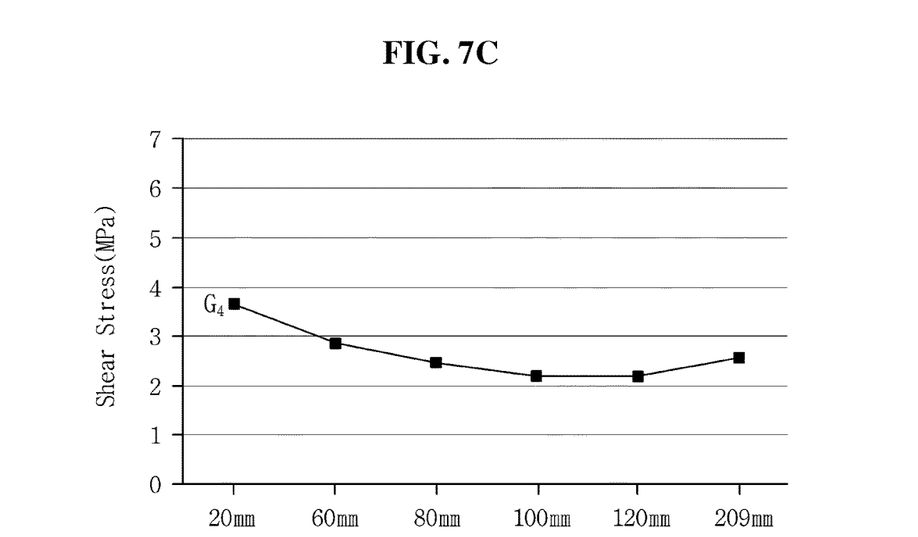

FIG. 3 is a schematic plan view illustrating a mold frame according to one embodiment of the present invention. FIG. 4 is a schematic perspective view illustrating a mold frame according to one embodiment of the present invention. FIG. 5 is an enlarged perspective view illustrating an "A" part of FIG. 1. FIG. 6 is a schematic cross-sectional view taken along a line II-II' of FIG. 1. FIGS. 7A to 7C are graphs illustrating stress caused on the display panel in accordance with a length of a corner portion and a gap of the display panel.

Referring to FIGS. 2 to 5, the mold frame 300 may include a base unit 310 and a protrusion 320.

The base unit 310 may include a side portion 311 and the corner portion 312. The side portion 311 and the corner portion 312 may be integrally formed or the side portion 311 and the corner portion 312 may be separately formed and connected to each other, in order to manufacture the base unit 310. As illustrated in FIG. 3, the base unit 310 may have an opening at a center portion and may overlap the edge portion of the display panel 200.

The side portion 311 may have a long side portion 311a and a short side portion 311b. The long side portion 311a may extend longer than the short side portion 311b.

The corner portion 312 may have a height lower than the side portion 311.

The protrusion 320 may be bent to extend from the base unit 310. As illustrated in FIGS. 2 and 5, the protrusion 320 may include, for example, a first protrusion 321 and a second protrusion 322. The protrusion 320 may be configured to fix the mold frame 300 to the bottom chassis 440. Only one of the first protrusion 321 and the second protrusion 322 may be formed as the protrusion 320. The protrusion 320 may be coupled to the bottom chassis 440 in many different forms and may not be limited to the above description.

The display panel 200 may be disposed on the mold frame 300 and at least partially space apart from the corner portion 312 of the mold frame 300. In some embodiments, the display panel 200 may be in contact with the side portion 311 of the mold frame 300 and be spaced apart from the corner portion 312. That is, a height of the corner portion 312 of the mold frame 300 may be formed to be lower than the side portion 311 thereof, which is different from a conventional display device, such that the display panel 200 can be spaced apart from the corner portion 312 of the mold frame 300. For example, the display panel 200 may be spaced apart from the corner portion 312 of the mold frame 300 in a range from about 0.01 mm to about 1 mm. As a result, as illustrated in FIG. 2, the display device may have a gap B between the display panel 200 and the corner portion 312 of the mold frame 300.

In the meantime, FIG. 6 only illustrates the display panel 200 and the corner portion 312 but other elements like the protrusion 320 are omitted for ease of description.

In FIG. 6, 1 represents a period where the radius of curvature of the display panel increases, 2 represents a depth of curvature before adjustment, and 3 represents a depth of curvature after adjustment. Meanwhile, the depth of curvature refers to a length between a neutral plane and an end portion that is most distanced from the neutral plane due to bending. The radius of curvature may be determined by the depth of curvature. The neutral plane refers to a surface maintaining an initial length without being lengthened or shortened, when an object is bent by external force.

As illustrated in FIG. 6, an end portion of the display panel 200 may be brought into contact with the corner portion 312 of the mold frame 300. The radius of curvature of the display panel 200 is increased in the gap B illustrated in FIG. 5. An end portion of the display panel 200 may be partially brought into contact with the corner portion 312 of the mold frame 300.

Meanwhile, as the end portion of the display panel 200 is in contact with the corner portion 312, the display panel 200 may have a larger radius of curvature in the corner portion 312 compared to the side portion 311. That is, in an area 1 illustrated in FIG. 6, the display panel 200 may have a larger radius of curvature compared to the other portions thereof.

Therefore, the overall radius of curvature of the display panel 200 may be increased. That is because the radius of curvature is inversely proportional to the depth of curvature. In more detail, for example, the display panel 200' may have a depth of curvature 2 of 72.8 mm and normalized curvature of 2500R before the radius of curvature is increased. Meanwhile, the display panel 200 may have a depth of curvature 3 of 71.8 mm and normalized curvature of 2535R after the radius of curvature is increased in the corner portion 312 of the mold frame 300. That is, in the display panel 200, the radius of curvature is increased in accordance with a decrease in the depth of curvature.

As a bending force exerted on an object is increased, the radius of curvature of the object may be reduced and the stress may become larger. Therefore, the radius of curvature is increased and the stress is reduced at the corner portion 312 of the display panel 200.

Accordingly, when having a radius of curvature larger at the corner portion of the display panel 200 and smaller adjacent to the center portion thereof, the display panel 200 may be subject to less stress at the corner portion compared to the center portion.

$$R2-200R \leq R1 \leq R2+200R \qquad \text{[Formula 1]}$$

Meanwhile, although the radius of curvature of the display panel 200 is changed, the changed radius of curvature may satisfy specification of desired curvature. First, R1 may refer to an adjusted curvature value and R2 may refer to a desired curvature value. In this case, the satisfying specification means that a difference between the adjusted curvature value and the desired curvature value is less than 200R. That is, Formula 1 should be satisfied in order to meet the specification.

As described above, when the mold frame 300 according to one embodiment of the present invention is applied, the adjusted curvature value of the display panel 200 is 2535R and the desired curvature value thereof is 2500R. Therefore, when the mold frame 300 according to one embodiment of the present invention is applied, the display panel 200 satisfies the specification.

In other words, as the corner portion 312 of the mold frame 300 is spaced apart from the display panel 200, the stress produced in the display panel 200 may be reduced and the adjusted curvature of the display panel 200 may also satisfy the specification of the desired curvature.

FIGS. 7A to 7C illustrate the stress reduction of the display panel 200 in accordance with a length of the corner portion 312.

Referring to FIG. 7A, the corner portion 312 may include a first corner portion 312a connected to the long side portion 311a of the base unit 310 and a second corner portion 312b bent and extending from the first corner portion 312a and connected to the short side portion 311b of the base unit 310.

TABLE 1

| | | Length of first corner portion | | | | |
|---|---|---|---|---|---|---|
| | | 10 mm | 20 mm | 40 mm | 90 mm | 100 mm | 120 mm |
| Stress in accordance with gap | 0.2 mm gap(G1) | 6.015 | 5.305 | 2.459 | 1.75 | 1.75 | 1.75 |
| | 0.4 mm gap(G2) | 3.849 | 3.273 | 1.648 | 1.648 | 1.648 | 1.648 |
| | 0.8 mm gap(G3) | 2.682 | 2.111 | 1.493 | 1.493 | 1.493 | 1.493 |

Referring to FIG. 7B and Table 1, X-axis of the graph represents a length L1 of the first corner portion 312a in millimeters and Y-axis of the graph represents a magnitude of stress. Table 1 illustrates the magnitude of the stress in accordance with the length L1 of the first corner portion 312a and the gap between the mold frame 300 and the display panel 200. G1, G2, and G3 respectively correspond to 0.2 mm, 0.4 mm, and 0.8 mm gaps. The 0.2 mm, 0.4 mm, and 0.8 mm gaps respectively refer to a gap between the mold frame 300 and the display panel 200. The stress is measured in MPa.

When the first corner portion 312a has a length in a range from about 90 mm to about 120 mm, the stress may be the smallest. That is, the radius of curvature is increased and the stress is reduced in the display panel 200, in accordance with an increase in the length L1 of the first corner portion 312a.

Further, the stress of the display panel 200 may be reduced in accordance with an increase in the gap between the mold frame 300 and the display panel 200. That is, because the radius of curvature of the display panel 200 is increased as the gap becomes larger between the mold frame 300 and the display panel 200, the stress of the display panel 200 may be reduced.

TABLE 2

| | Length of second corner portion | | | | | |
|---|---|---|---|---|---|---|
| | 20 mm | 60 mm | 80 mm | 100 mm | 120 mm | 140 mm |
| Stress in accordance with 0.2 mm gap(G4) | 3.638 | 2.861 | 2.476 | 2.217 | 2.209 | 2.565 |

Referring to FIG. 7C and Table 2, X-axis of the graph represents a length L2 of the second corner portion 312b in millimeters and Y-axis of the graph represents a magnitude of stress. G4 corresponds to a 0.2 mm gap. Table 2 represents the magnitude of the stress in accordance with the length L2 of the second corner portion 312b and the gap between the mold frame 300 and the display panel 200. The 0.2 mm gap refers to a gap between the mold frame 300 and the display panel 200. The stress is measured in MPa.

When the second corner portion 312b has a length in a range from about 100 mm to about 120 mm, the stress may be the smallest. That is, the radius of curvature is increased and the stress is reduced in the display panel 200, in accordance with an increase in the length L2 of the second corner portion 312b.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device, comprising:
    a bottom chassis;
    a mold frame coupled to the bottom chassis;
    a display panel having curvature and disposed on the mold frame; and
    a light source disposed on the bottom chassis and configured to supply light to the display panel,
    the mold frame comprising:
        a base unit having a corner portion that has a lower height than a side portion, said corner portion extending an entire width of the base unit but not an entire length of one side of the base unit, wherein an entirety of the corner portion of the base unit has a lower height than that of the side portion of the base unit; and
        a protrusion bent and extending from the base unit.

2. The display device of claim 1, wherein the display panel is at least partially spaced apart from the corner portion of the mold frame.

3. The display device of claim 2, wherein the display panel is spaced apart from the corner portion of the mold frame in a range from 0.01 mm to 1 mm.

4. The display device of claim 2, wherein an end portion of the display panel is in contact with the corner portion of the mold frame.

5. The display device of claim 4, wherein the display panel has a larger radius of curvature at the corner portion compared to the side portion of the mold frame.

6. The display device of claim 4, wherein the side portion of the mold frame has a long side portion and a short side portion.

7. The display device of claim 6, wherein the corner portion of the mold frame comprises:
    a first corner portion connected to the long side portion of the base unit; and
    a second corner portion bent and extending from the first corner portion and connected to the short side portion of the base unit.

8. The display device of claim 7, wherein the first corner portion has a length in a range from 90 mm to 120 mm.

9. The display device of claim 1, further comprising a support mold coupled to the bottom chassis.

10. The display device of claim 9, further comprising a diffusion plate fixed to the support mold and configured to guide light emitted from the light source toward the display panel.

11. The display device of claim 1, wherein an entirety of the corner portion of the base unit has a height that is less than any point on the side portion of the base unit.

12. The display device of claim 1, wherein each corner portion of the display panel has a larger radius of curvature than a remainder of the display panel, the larger radius of curvature of the corner portions of the display panel being attributed to bending the corner portions of the display panel into a front surface of the corner portions of the base unit of the mold frame, the front surface of the corner portions of the base unit of the mold frame being recessed as compared to all other portions of the front side of the base unit of the mold frame.

13. The display device of claim 1, further comprising an optical portion of a backlight assembly that includes a plurality of optical sheets, a diffusion plate and the light source unit, the optical portion of the backlight assembly being arranged on a back side of the display panel to serve as a light source for the display panel, the base unit of the mold frame being interposed between the display panel and the optical portion of the backlight assembly.

14. The display device of claim 13, further comprising a support mold interposed between the bottom chassis and the optical portion of the backlight assembly and between the bottom chassis and the mold frame, each of the mold frame and the support mold are comprised of a flexible plastic material.

15. A display device, comprising:
a bottom chassis;
a mold frame coupled to the bottom chassis and being comprised of a flexible plastic material;
a display panel having curvature and disposed on the mold frame; and
an optical portion of a backlight assembly interposed between the bottom chassis and the mold frame and being configured to supply light to the display panel, the mold frame including a base unit having a front surface that faces the display panel, wherein corner portions of the front surface of the base unit of the mold frame are recessed as compared to all other portions of the front surface of the base unit of the mold frame, wherein corner portions of the display panel that correspond to the corner portions of the front surface of the base unit of the mold frame have a larger radius of curvature than portions of the display panel that correspond to all other portions of the front surface of the base unit of the mold frame.

16. The display device of claim 15, wherein the corner portions of the display panel have the larger radius of curvature by bending the corner portions of the display panel so that the corner portions of the display panel contact the recessed corner portions of the front surface of the base unit of the mold frame.

17. The display device of claim 15, wherein portions of the display panel external to the corner portions have a radius of curvature that corresponds to a radius of curvature of the front surface of the other portions of the base unit of the mold frame.

18. The display device of claim 15, wherein the corner portions of the front surface of the base unit are recessed as compared to portions of the front surface of the base unit of the mold frame that are interposed between two adjoining corner portions of the base unit of the mold frame.

19. The display device of claim 15, wherein the display panel has four peripheral edges, the corner portion of the display panel is where two of these peripheral edges meet, a portion of the front surface of the mold frame corresponding to each corner portion of the display panel is recessed as compared to a portion of the front surface of the base unit of the mold frame that corresponds to a point on the display panel half way between two adjoining corner portions of the display panel.

20. The display device of claim 15, wherein the corner portions of the display panel have the larger radius of curvature by being accommodated with and contacting the front surface of the recessed corner portions of the base unit of the mold frame.

* * * * *